DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JULY 25, 1972

900 O.G. 1232

T900,024
EXTRUSION APPARATUS FOR MANUFACTURE OF THERMOPLASTIC PIPE

Edward R. Hollander, Jr., 124 Bloomingdale Pike, Apt. 27, Kingsport, Tenn. 37660

Filed June 1, 1971, Ser. No. 148,566
Int. Cl. B29d *23/04*
U.S. Cl. 18—14 A
1 Sheet Drawing. 10 Pages Specification

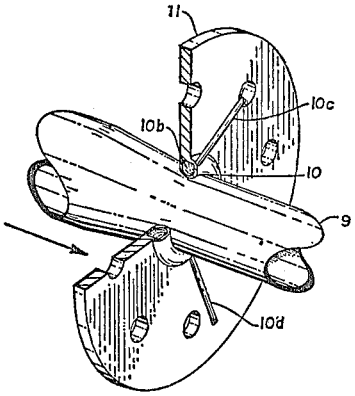

Improved apparatus for the manufacture of plastic pipe and tubing including a forming die, a sizing plate, a water cooling bath contained in a closed chamber wherein a partial vacuum is maintained, the improvement which consists in provision of a hollow tubular cooling element attached to or unitary with the sizing plate around the entire rim of the sizing orifice to form a chamber through which a coolant is continuously circulated. This element is particularly characterized by presenting a smooth, cooled, rounded edge circular sizing orifice to prevent formation of defects in the outer surface of the pipe which might otherwise arise from adhesion of the molten plastic to the metal surface of the sizing orifice, or from irregularities in the surface of an unrounded orifice, thus eliminating the need for employment of any type of lubricant at the sizing orifice.

July 25, 1972 E. R. HOLLANDER, JR T900,024
EXTRUSION APPARATUS FOR MANUFACTURE OF THERMOPLASTIC PIPE
Filed June 1, 1971
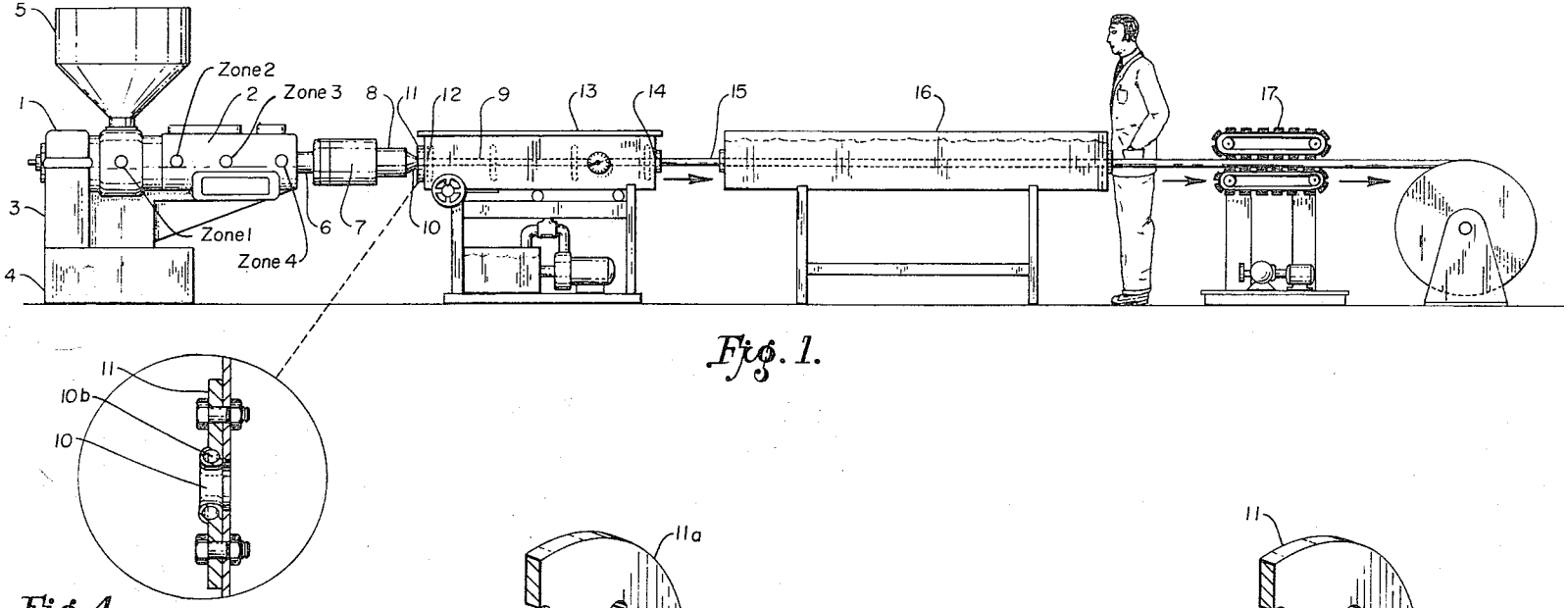
Fig. 1.
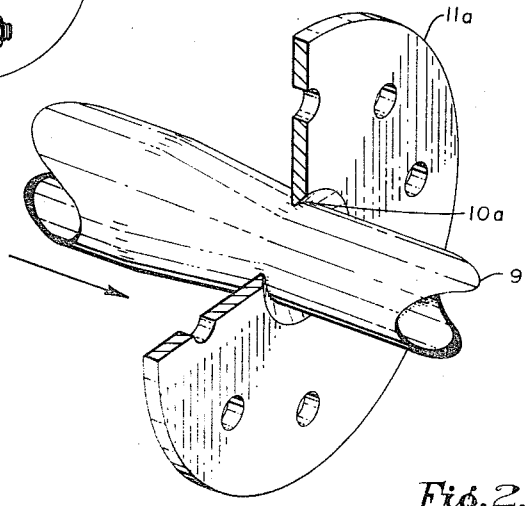
Fig. 2.
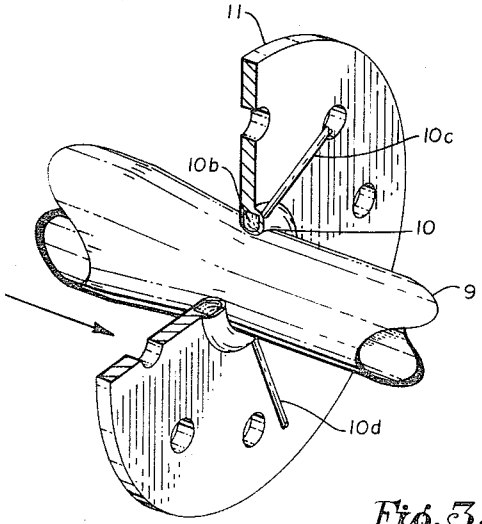
Fig. 3.
Fig. 4.
EDWARD R. HOLLANDER, JR.
INVENTOR.